United States Patent
Wang et al.

(10) Patent No.: US 11,427,510 B1
(45) Date of Patent: Aug. 30, 2022

(54) METHOD AND ARTICLE FOR IMPROVING THE STRENGTH OF CARBONATED CALCIUM HYDROXIDE COMPACTS

(71) Applicant: Wuhan University of Technology, Wuhan (CN)

(72) Inventors: Fazhou Wang, Wuhan (CN); Zhichao Liu, Wuhan (CN); Shuguang Hu, Wuhan (CN)

(73) Assignee: WUHAN UNIVERSITY OF TECHNOLOGY, Wuhan (CN)

( * ) Notice: Subject to any disclaimer, the term of this patent is extended or adjusted under 35 U.S.C. 154(b) by 0 days.

(21) Appl. No.: 17/705,021

(22) Filed: Mar. 25, 2022

(30) Foreign Application Priority Data

Aug. 19, 2021 (CN) .......................... 202110954188.3

(51) Int. Cl.
| | |
|---|---|
| *C04B 28/12* | (2006.01) |
| *C04B 40/00* | (2006.01) |
| *C04B 40/02* | (2006.01) |
| *C04B 14/06* | (2006.01) |

(52) U.S. Cl.
CPC .............. *C04B 28/12* (2013.01); *C04B 14/06* (2013.01); *C04B 40/0071* (2013.01); *C04B 40/0231* (2013.01)

(58) Field of Classification Search
CPC ..... C04B 14/06; C04B 28/12; C04B 40/0071; C04B 40/0231
See application file for complete search history.

(56) References Cited

U.S. PATENT DOCUMENTS 8,057,594 B2 * 11/2011 Doyoyo .................. C04B 26/32
106/681

FOREIGN PATENT DOCUMENTS

| CN | 107673700 A | * | 2/2018 |
| JP | 2000086312 A | * | 3/2000 |

OTHER PUBLICATIONS

CNIPA, Notification to grant patent right for invention for CN 202110954188.3, dated Jan. 12, 2022.
Allowed claims for CN 202110954188.3, Jan. 12, 2022.

* cited by examiner

*Primary Examiner* — Anthony J Green
(74) *Attorney, Agent, or Firm* — Hemisphere Law, PLLC; Zhigang Ma

(57) ABSTRACT

The present disclosure discloses a method and an article for improving the strength of carbonated calcium hydroxide compacts. The method includes the following steps: calcium hydroxide-rich materials, ordinary portland cement, magnesium hydroxide, pottery sand and water are mixed according to the mass ratio of 100:15-20:15-20:40-80:10-20, then the mixture was compressed, carbonated and naturally cured to obtain the carbonated compacts. The present disclosure utilizes cement hydration and magnesium hydroxide carbonation to consume the water produced by calcium hydroxide carbonation, the C-S-H gelation effect produced by cement hydration, the cementation effect of magnesium hydroxide carbonation products, the volume expansion effect of magnesium hydroxide carbonation and the gas transmission channel and internal curing effect of pottery sand further improve the carbonation degree, product gelation, thus greatly improving the strength of carbonated calcium hydroxide compacts.

10 Claims, 1 Drawing Sheet

METHOD AND ARTICLE FOR IMPROVING THE STRENGTH OF CARBONATED CALCIUM HYDROXIDE COMPACTS

FIELD OF THE DISCLOSURE

The disclosure relates to a method and an article for improving the strength of carbonated calcium hydroxide compacts, which can greatly improve the mechanical properties of carbonation products (carbonated bricks, aerated concrete, etc.) based on calcium hydroxide-rich solid waste.

BACKGROUND

Calcium hydroxide has excellent carbonation reactivity, and it is the main component of many bulk industrial solid wastes, such as carbide slag, thiourea slag, etc. Using the carbonation reaction of the solid waste and $CO_2$ to prepare bricks, blocks and other products can effectively absorb and consolidate $CO_2$. And it can realize the resource disposal of solid waste, which has a good application prospect.

Calcium hydroxide has high carbonation reactivity. However, a large amount of water will be released during the reaction process, resulting in an inability to form an effective lap network between the generated calcium carbonate grains. The obtained carbonated compacts has low strength, thus greatly limiting the application of the solid waste rich in calcium hydroxide.

Patent CN202010771454.4 discloses a method for preparing carbonated bricks by wet grinding carbide slag. In this work, carbonated bricks are obtained in the following steps: firstly, the carbide slag is ground into slurry by wet grinding process, and then gypsum, slag and fine aggregate are added into the slurry to form a mixed mortar, and later the mixed mortar is carbonated to obtain the carbonated bricks. The particle size is refined by wet grinding, which helps to increase reactivity. However, the compressive strength of the obtained carbonated brick is still low, only 15.3Mpa at 1 day.

SUMMARY

A technical problem to be solved by the disclosure is that calcium hydroxide releases a large amount of water in the accelerated carbonation process, resulting in poor cementation between the formed calcium carbonate grains and low strength of the carbonated compacts.

In the first aspect, the present disclosure provides a method for improving the strength of carbonated calcium hydroxide compacts, including the following steps:

Calcium hydroxide-rich materials, ordinary portland cement, magnesium hydroxide, pottery sand and water are mixed uniformly according to the mass ratio of 100:15-20:15-20:40-80:10-20, and then the mixture was compressed, carbonated and naturally cured to obtain the carbonated compacts.

In second aspect, the present disclosure provides an article, which is obtained by the method of the present disclosure above.

The advantages of the technical scheme proposed in the disclosure are as follows:

The present disclosure takes advantage of the synergy between physical adsorption and chemical reaction. When cement hydration and magnesium hydroxide carbonation consume the water produced by calcium hydroxide carbonation, the C-S-H gelation effect produced by cement hydration, the cementation effect produced by magnesium hydroxide carbonation products, the volume expansion effect produced by magnesium hydroxide carbonation reaction, and the gas transmission channel and internal curing effect of the pottery sand further improve the degree of carbonation, the gelatinization of products, and the compactness of carbonated compacts, thus greatly improving the strength of the carbonated calcium hydroxide compacts.

The method can be used for the safe disposal of calcium hydroxide-rich solid waste (such as carbide slag, thiourea slag, etc.), and greatly increase the mechanical properties of carbonation products (such as carbonated brick, aerated concrete, etc.) based on calcium hydroxide-rich solid waste.

BRIEF DESCRIPTION OF THE DRAWINGS

Accompanying drawings are for providing further understanding of embodiments of the disclosure. The drawings form a part of the disclosure and are for illustrating the principle of the embodiments of the disclosure along with the literal description. Apparently, the drawings in the description below are merely some embodiments of the disclosure, a person skilled in the art can obtain other drawings according to these drawings without creative efforts. In the figures.

DETAILED DESCRIPTION OF PREFERRED EMBODIMENTS

Figure 1:
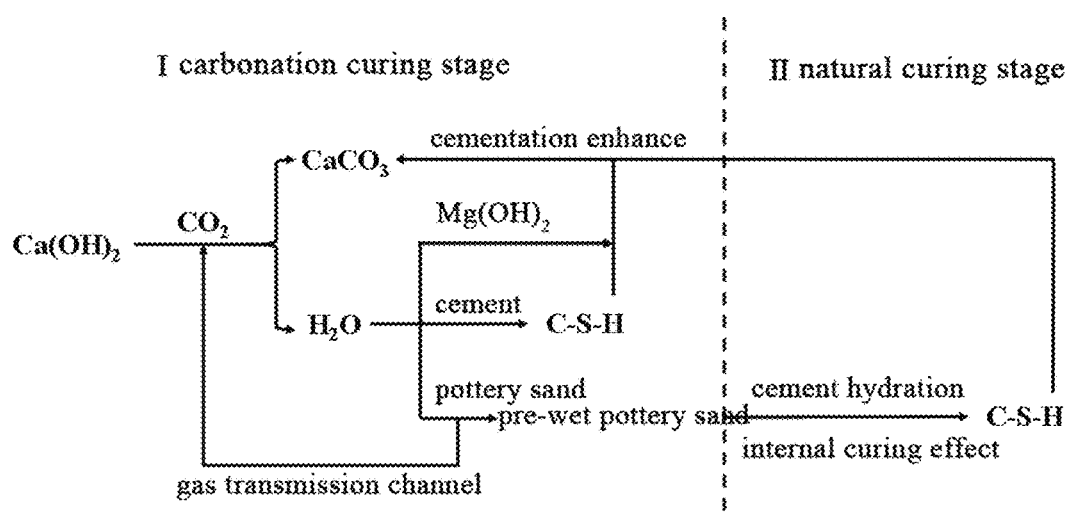
FIG. 1 is a flow diagram of the method for improving the strength of carbonated calcium hydroxide compacts.

For the first aspect provided by the present disclosure, it is provided a method for improving the strength of carbonated calcium hydroxide compacts, including the following steps:

Calcium hydroxide-rich materials, ordinary portland cement, magnesium hydroxide, pottery sand and water are mixed uniformly according to the mass ratio of 100:15-20:15-20:40-80:10-20, and then the mixture was compressed, carbonated and naturally cured to obtain the carbonated compacts.

In the present disclosure, the water released by the carbonation reaction of calcium hydroxide and $CO_2$ is consumed in time by the hydration reaction of ordinary portland cement, the carbonation reaction of magnesium hydroxide (chemical effect) and the adsorption effect of porous pottery sand (physical effect). It is beneficial to the overlap between calcium carbonate particles formed by the carbonation reaction of calcium hydroxide. The hydrated calcium silicate (C-S-H) gel produced by cement hydration, and the volume expansion of $MgCO_3 \cdot 3H_2O$ produced by carbonation of magnesium hydroxide increase the contact between particles, which can effectively gel the calcium carbonate particles. By controlling the water absorption state of the porous pottery sand, the molding of the green body is ensured and additional water absorption space is reserved. At the same time, the pottery sand is evenly dispersed in the matrix. In the process of carbonation curing, the pottery sand can promote the transmission of $CO_2$ gas from outside to inside as the gas transmission channel, thus improving the carbonation degree (physical effect). In the process of natural curing, the pottery sand can gradually release the water stored in the internal pore structure as the internal curing medium, thus promoting the hydration reaction of cement and the carbonation reaction of magnesium hydroxide (chemical effect).

In the present disclosure, the calcium hydroxide-rich materials include calcium hydroxide or substances with calcium hydroxide as the main component. Further, the content of calcium hydroxide in the substances with calcium hydroxide as the main component is more than 70%. The present disclosure does not limit the specific type of the substances with calcium hydroxide as the main component, and those skilled in the art can select as needed, for example, it can be solid waste, such as carbide slag, thiourea slag, etc.

In the present disclosure, the open pore porosity of pottery sand is 10-15%

Preferably, the mass ratio of calcium hydroxide-rich materials to ordinary portland cement and magnesium hydroxide is 100:20:20.

Preferably, the mass ratio of calcium hydroxide-rich materials to pottery sand is 100:(40-50). Further, the mass ratio of calcium hydroxide-rich materials to pottery sand is 100:50.

Preferably, the mass ratio of calcium hydroxide-rich materials to water is 100:(15-20). Further, the mass ratio of calcium hydroxide-rich materials to water is 100:15.

In the present disclosure, the process of mixing calcium hydroxide-rich materials, ordinary portland cement, magnesium hydroxide, pottery sand and water uniformly are as follows: the calcium hydroxide-rich materials, ordinary portland cement, magnesium hydroxide and water are mixed uniformly, and then the pottery sand is added and mixed uniformly.

In the present disclosure, the pressure used in the compression molding process is 5-30 MPa.

Preferably, the pressure used in the compression molding process is 15 MPa.

In the present disclosure, the carbonation conditions are as follows: carbonation temperature is 5-90° C., relative humidity is 20-100%, carbon dioxide concentration is 10-99.8%, air pressure is 0.05-0.3 MPa, and carbonation time is 2-12 hours.

Further, the carbonation conditions are as follows: carbonation temperature is 25° C., relative humidity is 50%, carbon dioxide concentration is 99.8%, air pressure is 0.1 MPa, and carbonation time is 8 hours.

In the present disclosure, the natural curing conditions are as follows: the natural curing temperature is 15-25° C.

Further, the natural curing temperature is 20° C., and the natural curing time is 1-7 days.

For the second aspect provided by the present disclosure, it is provided an article. The article is the carbonated calcium hydroxide compacts obtained by the method for improving the strength of carbonated calcium hydroxide compacts provided by the first aspect of the present disclosure.

Example 1

Firstly, in parts by mass, 100 parts of calcium hydroxide was mixed with 20 parts of ordinary portland cement, 20 parts of magnesium hydroxide and 15 parts of water. Then, 50 parts of pottery sand was added into the mixture and mixed evenly. Subsequently, the mixture was compressed under the pressure of 15 MPa and carbonated in carbonation reactor. The carbonation conditions were as follows: the carbonation temperature was 25° C., the relative humidity was 50%, the carbon dioxide concentration was 99.8%, the air pressure was 0.1 MPa, and the carbonation time was 8 h. Finally, it was naturally cured at 20° C. to the specified age.

The compressive strength of the carbonated calcium hydroxide compacts obtained in Example 1 was 60 MPa at 1 day, and 75 Mpa at 7 days.

Example 2

Firstly, in parts by mass, 100 parts of calcium hydroxide was mixed with 20parts of ordinary portland cement, 20 parts of magnesium hydroxide and 10 parts of water. Then, 50 parts of pottery sand was added into the mixture and mixed evenly. Subsequently, the mixture was compressed under the pressure of 15 MPa and carbonated in carbonation reactor. The carbonation conditions were as follows: the carbonation temperature was 25° C., the relative humidity was 50%, the carbon dioxide concentration was 99.8%, the air pressure was 0.1 MPa, and the carbonation time was 8 h. Finally, it was naturally cured at 20° C. to the specified age.

The compressive strength of the carbonated calcium hydroxide compacts obtained in Example 2 was 49 MPa at 1 day, and 62 MPa at 7 days.

Example 3

Firstly, in parts by mass, 100 parts of calcium hydroxide was mixed with 20 parts of ordinary portland cement, 20 parts of magnesium hydroxide and 20 parts of water. Then, 50 parts of pottery sand was added into the mixture and mixed evenly. Subsequently, the mixture was compressed under the pressure of 15 MPa and carbonated in carbonation reactor. The carbonation conditions were as follows: the carbonation temperature was 25° C., the relative humidity was 50%, the carbon dioxide concentration was 99.8%, the air pressure was 0.1 MPa, and the carbonation time was 8 h. Finally, it was naturally cured at 20° C. to the specified age.

The compressive strength of the carbonated calcium hydroxide compacts obtained in Example 3 was 53 MPa at 1 day, and 69 MPa at 7 days.

Example 4

Firstly, in parts by mass, 100 parts of calcium hydroxide was mixed with 20 parts of ordinary portland cement, 20 parts of magnesium hydroxide and 15 parts of water. Then, 40 parts of pottery sand was added into the mixture and mixed evenly. Subsequently, the mixture was compressed under the pressure of 15 MPa and carbonated in carbonation reactor. The carbonation conditions were as follows: the carbonation temperature was 25° C., the relative humidity was 50%, the carbon dioxide concentration was 99.8%, the air pressure was 0.1 MPa, and the carbonation time was 8 h. Finally, it was naturally cured at 20° C. to the specified age.

The compressive strength of the carbonated calcium hydroxide compacts obtained in Example 4 was 49 MPa at 1 day, and 63 MPa at 7 days.

Example 5

Firstly, in parts by mass, 100 parts of calcium hydroxide was mixed with 20parts of ordinary portland cement, 20 parts of magnesium hydroxide and 15 parts of water. Then, 80 parts of pottery sand was added into the mixture and mixed evenly. Subsequently, the mixture was compressed under the pressure of 15 MPa and carbonated in carbonation reactor. The carbonation conditions were as follows: the carbonation temperature was 25° C., the relative humidity was 50%, the carbon dioxide concentration was 99.8%, the air pressure was 0.1 MPa, and the carbonation time was 8 h. Finally, it was naturally cured at 20° C. to the specified age.

The compressive strength of the carbonated calcium hydroxide compacts obtained in Example 5 was 42 MPa at 1 day, and 50 MPa at 7 days.

Example 6

Firstly, in parts by mass, 100 parts of calcium hydroxide was mixed with 15parts of ordinary portland cement, 15 parts of magnesium hydroxide and 15 parts of water. Then, 50 parts of pottery sand was added into the mixture and mixed evenly. Subsequently, the mixture was compressed under the pressure of 15 MPa and carbonated in carbonation reactor. The carbonation conditions were as follows: the carbonation temperature was 25° C., the relative humidity was 50%, the carbon dioxide concentration was 99.8%, the air pressure was 0.1 MPa, and the carbonation time was 8 h. Finally, it was naturally cured at 20° C. to the specified age.

The compressive strength of the carbonated calcium hydroxide compacts obtained in Example 6 was 41 MPa at 1 day, and 61 MPa at 7 days.

Example 7

Firstly, in parts by mass, 100 parts of calcium hydroxide was mixed with 15parts of ordinary portland cement, 20 parts of magnesium hydroxide and 15 parts of water. Then, 50 parts of pottery sand was added into the mixture and mixed evenly. Subsequently, the mixture was compressed under the pressure of 15 MPa and carbonated in carbonation reactor. The carbonation conditions were as follows: the carbonation temperature was 25° C., the relative humidity was 50%, the carbon dioxide concentration was 99.8%, the air pressure was 0.1 MPa, and the carbonation time was 8 h. Finally, it was naturally cured at 20° C. to the specified age.

The compressive strength of the carbonated calcium hydroxide compacts obtained in Example 7 was 46 MPa at 1 day, and 75 MPa at 7 days.

Example 8

Firstly, in parts by mass, 100 parts of carbide slag containing 80% calcium hydroxide was mixed with 20 parts of ordinary portland cement, 20 parts of magnesium hydroxide and 15 parts of water. Then, 50 parts of pottery sand was added into the mixture and mixed evenly. Subsequently, the mixture was compressed under the pressure of 15 MPa and carbonated in carbonation reactor. The carbonation conditions were as follows: the carbonation temperature was 25° C., the relative humidity was 50%, the carbon dioxide concentration was 99.8%, the air pressure was 0.1 MPa, and the carbonation time was 8 h. Finally, it was naturally cured at 20° C. to the specified age.

The compressive strength of the carbonated carbide slag compacts obtained in Example 8 was 47 MPa at 1 day, and 61 MPa at 7 days.

Example 9

Firstly, in parts by mass, 100 parts of thiourea slag containing 80% calcium hydroxide was mixed with 20 parts of ordinary portland cement, 20 parts of magnesium hydroxide and 15 parts of water. Then, 50 parts of pottery sand was added into the mixture and mixed evenly. Subsequently, the mixture was compressed under the pressure of 15 MPa and carbonated in carbonation reactor. The carbonation conditions were as follows: the carbonation temperature was 25° C., the relative humidity was 50%, the carbon dioxide concentration was 99.8%, the air pressure was 0.1 MPa, and the carbonation time was 8 h. Finally, it was naturally cured at 20° C. to the specified age.

The compressive strength of the carbonated thiourea slag compacts obtained in Example 9 was 48 MPa at 1 day, and 64 MPa at 7 days.

Comparative Example 1

Firstly, in parts by mass, 100 parts of calcium hydroxide was mixed with 15parts of water. Then, the mixture was compressed under the pressure of 15 MPa and carbonated in carbonation reactor. The carbonation conditions were as follows: the carbonation temperature was 25° C., the relative humidity was 50%, the carbon dioxide concentration was 99.8%, the air pressure was 0.1 MPa, and the carbonation time was 8 h. Finally, it was naturally cured at 20° C. to the specified age.

The compressive strength of the carbonated calcium hydroxide compacts obtained in Comparative Example 1 was 25 MPa at 1 day, and 27 MPa at 7 days.

Comparative Example 2

Firstly, in parts by mass, 100 parts of calcium hydroxide was mixed with 20parts of ordinary portland cement, 20 parts of magnesium hydroxide and 15 parts of water. Then, the mixture was compressed under the pressure of 15 MPa and carbonated in carbonation reactor. The carbonation conditions were as follows: the carbonation temperature was 25° C., the relative humidity was 50%, the carbon dioxide concentration was 99.8%, the air pressure was 0.1 MPa, and the carbonation time was 8 h. Finally, it was naturally cured at 20° C. to the specified age.

The compressive strength of the carbonated calcium hydroxide compacts obtained in Comparative Example 2 was 37 MPa at 1 day, and 54 MPa at 7 days.

Comparative Example 3

Firstly, in parts by mass, 100 parts of calcium hydroxide was mixed with 20parts of magnesium hydroxide and 15 parts of water. Then, 50 parts of pottery sand was added into the mixture and mixed evenly. Subsequently, the mixture was compressed under the pressure of 15 MPa and carbonated in carbonation reactor. The carbonation conditions were as follows: the carbonation temperature was 25° C., the relative humidity was 50%, the carbon dioxide concentration was 99.8%, the air pressure was 0.1 MPa, and the carbonation time was 8h. Finally, it was naturally cured at 20° C. to the specified age.

The compressive strength of the carbonated calcium hydroxide compacts obtained in Comparative Example 3 was 36 MPa at 1 day, and 40 MPa at 7 days.

Comparative Example 4

Firstly, in parts by mass, 100 parts of calcium hydroxide was mixed with 20parts of ordinary portland cement and 15 parts of water. Then, 50 parts of pottery sand was added into the mixture and mixed evenly. Subsequently, the mixture was compressed under the pressure of 15 MPa and carbonated in carbonation reactor. The carbonation conditions were as follows: the carbonation temperature was 25° C., the relative humidity was 50%, the carbon dioxide concentration was 99.8%, the air pressure was 0.1 MPa, and the carbonation time was 8 h. Finally, it was naturally cured at 20° C. to the specified age.

The compressive strength of the carbonated calcium hydroxide compacts obtained in Comparative Example 4 was 34 MPa at 1 day, and 39 MPa at 7 days.

Comparative Example 5

Firstly, in parts by mass, 50 parts of pottery sand was mixed with 15 parts of water. After the pottery sand absorbed water to saturation, 100 parts of calcium hydroxide, 20 parts of ordinary portland cement, and 20 parts of magnesium hydroxide was added into the mixture and mixed evenly. Subsequently, the mixture was compressed under the pressure of 15 MPa and carbonated in carbonation reactor. The carbonation conditions were as follows: the carbonation temperature was 25° C., the relative humidity was 50%, the carbon dioxide concentration was 99.8%, the air pressure was 0.1 MPa, and the carbonation time was 8 h. Finally, it was naturally cured at 20° C. to the specified age.

The compressive strength of the carbonated calcium hydroxide compacts obtained in Comparative Example 5 was 27 MPa at 1 day, and 32 MPa at 7 days.

Figure 2:
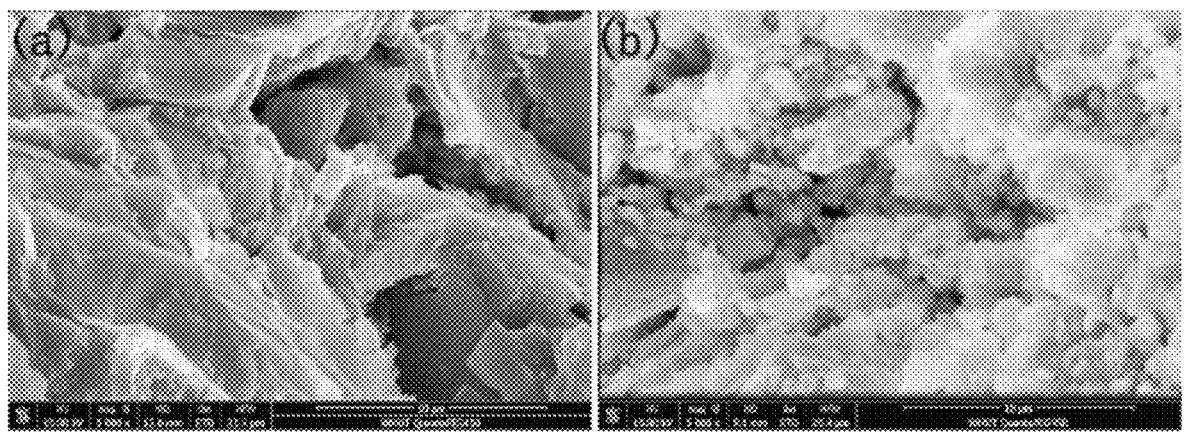
FIG. 2 (a) and (b) are SEM images of the carbonated articles provided in Example 1 and Comparative Example 1 respectively.
Figure 3:
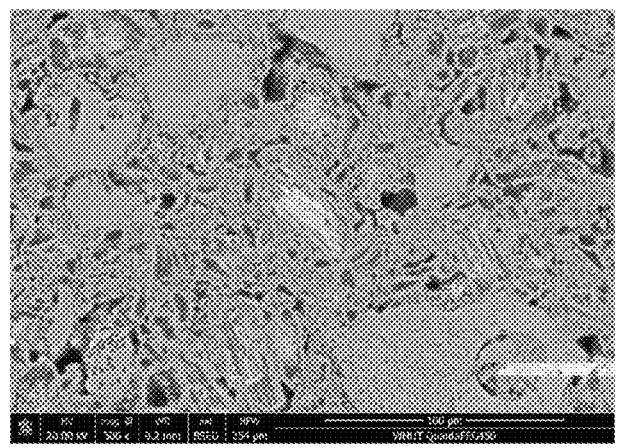
FIG. 3 is a backscatter diagram of the carbonated article provided in Example 1.

FIG. 2 (a) and (b) are SEM images of the carbonated articles provided in Example 1 and Comparative Example 1 respectively; In Comparative Example 1, due to the generation of water, the calcite generated by the carbonation reaction of pure calcium hydroxide tends to form separate particles, and the cementation effect between particles is weak; in Example 1, cement, magnesium hydroxide and pottery sand absorb and consume the water generated by the carbonation reaction, the carbonation products are contacted and cemented with each other, which has a strong interaction effect and shows excellent compressive strength macroscopically. FIG. 3 is a backscatter diagram of the carbonated article provided in Example 1. It can be clearly observed that the interface of porous pottery sand and the product is closely bonded. The porous structure of the pottery sand provides gas transmission channels to promote the carbonation reaction in the carbonation stage and releases stored moisture as an internal curing material for cement hydration in the hydration stage. Therefore, the carbonation products and the hydration products will be wrapped, avoiding the introduction of weak interfacial regions.

The above descriptions are only preferred embodiments of the present disclosure and are not intended to limit the present disclosure. Any modification, equivalent replacement, improvement, etc. made within the spirit and principle of the present disclosure shall be included in the protection of the present disclosure.

What is claimed is:

1. A method for improving the strength of carbonated calcium hydroxide compacts, including the following steps: calcium hydroxide-rich materials, ordinary portland cement, magnesium hydroxide, pottery sand and water are mixed uniformly according to the mass ratio of 100:15-20:15-20:40-80:10-20, and then the mixture was compressed, carbonated and naturally cured to obtain the carbonated compacts.

2. The method for improving the strength of carbonated calcium hydroxide compacts according to claim 1, wherein the calcium hydroxide-rich materials include calcium hydroxide or substances with calcium hydroxide as the main component.

3. The method for improving the strength of carbonated calcium hydroxide compacts according to claim 2, wherein the content of calcium hydroxide in the substances with calcium hydroxide as the main component is more than 70%.

4. The method for improving the strength of carbonated calcium hydroxide compacts according to claim 1, wherein the open porosity of pottery sand is 10-15%.

5. The method for improving the strength of carbonated calcium hydroxide compacts according to claim 1, wherein the mass ratio of calcium hydroxide-rich materials to ordinary portland cement and magnesium hydroxide is 100:20:20.

6. The method for improving the strength of carbonated calcium hydroxide compacts according to claim 1, wherein the mass ratio of calcium hydroxide-rich materials to pottery sand is 100:(40-50).

7. The method for improving the strength of carbonated calcium hydroxide compacts according to claim 1, wherein the mass ratio of calcium hydroxide-rich materials to water is 100:(15-20).

8. The method for improving the strength of carbonated calcium hydroxide compacts according to claim 1, the process of mixing calcium hydroxide-rich materials, ordinary portland cement, magnesium hydroxide, pottery sand and water uniformly is as follows: the calcium hydroxide-rich materials, ordinary portland cement, magnesium hydroxide and water are mixed uniformly, and then the pottery sand is added and mixed uniformly.

9. The method for improving the strength of carbonated calcium hydroxide compacts according to claim 1, the carbonation conditions are as follows: carbonation temperature is 5-90° C., relative humidity is 20-100%, carbon dioxide concentration is 10-99.8%, air pressure is 0.05-0.3 MPa, and carbonation time is 2-12 hours.

10. An article, the article is the carbonated calcium hydroxide compacts obtained by the method for improving the strength of carbonated calcium hydroxide compacts in claim 1.

* * * * *